(12) United States Patent
Tang et al.

(10) Patent No.: US 10,712,782 B2
(45) Date of Patent: *Jul. 14, 2020

(54) FRONT COVER ASSEMBLY AND TERMINAL

(71) Applicant: GUANGDONG OPPO MOBILE TELECOMMUNICATIONS CORP., LTD., Dongguan, Guangdong (CN)

(72) Inventors: Yimei Tang, Guangdong (CN); Yong Li, Guangdong (CN); Hong Zou, Guangdong (CN); Yi Sun, Guangdong (CN); Wei Zhang, Guangdong (CN); Xinfeng Liao, Guangdong (CN); Zhiqin Hu, Guangdong (CN); Xiaohui Wang, Guangdong (CN); Bing Liu, Guangdong (CN); Yuchu Xu, Guangdong (CN); Wei Chen, Guangdong (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/253,686

(22) Filed: Jan. 22, 2019

(65) Prior Publication Data

US 2019/0155340 A1 May 23, 2019

Related U.S. Application Data

(63) Continuation of application No. 15/713,663, filed on Sep. 24, 2017, now Pat. No. 10,198,042, which is a
(Continued)

(30) Foreign Application Priority Data

Aug. 31, 2015 (CN) .......................... 2015 1 0552123

(51) Int. Cl.
*G06F 1/16* (2006.01)
*H04M 1/02* (2006.01)

(52) U.S. Cl.
CPC .............. *G06F 1/1656* (2013.01); *G06F 1/16* (2013.01); *H04M 1/02* (2013.01)

(58) Field of Classification Search
CPC ........ G06F 1/1656; G06F 1/16; G06F 1/1601; G06F 1/1616; G06F 1/1618; G06F 1/1626; G06F 1/1679; H04M 1/02
See application file for complete search history.

(56) References Cited

U.S. PATENT DOCUMENTS 7,210,963 B2 5/2007 Chintala et al.
8,218,306 B2 7/2012 Lynch et al.
(Continued)

FOREIGN PATENT DOCUMENTS

| CN | 203615200 | 5/2014 |
|---|---|---|
| CN | 203748139 | 7/2014 |

(Continued)

OTHER PUBLICATIONS

SIPO, First Office Action for CN Application No. 201510552123, dated Aug. 15, 2016.
(Continued)

*Primary Examiner* — Daniel P Wicklund
*Assistant Examiner* — Sagar Shrestha
(74) *Attorney, Agent, or Firm* — Hodgson Russ LLP

(57) ABSTRACT

A front cover assembly includes a frame, a cover glass, and a waterproof glue. The frame has a receiving cavity. The cover glass is partially received in the frame. The cover glass has a lateral face facing the frame. The cover glass has a step portion located at the lateral face. A first gap is defined between a first face of the step portion of the cover glass and a first wall of the frame, and a second gap is defined between (Continued)

a second face of the step portion of the cover glass and a second wall of the frame. A waterproof glue fills the first and second gaps. The first and second faces of the step portion from an obtuse angle therebetween, which faces the first and second walls of the frame. The present disclosure also relates to a terminal.

17 Claims, 5 Drawing Sheets

Related U.S. Application Data continuation of application No. PCT/CN2016/081496, filed on May 10, 2016.

(56) References Cited

U.S. PATENT DOCUMENTS

| | | | |
|---|---|---|---|
| 8,578,081 | B1 | 11/2013 | Fils |
| 9,616,625 | B2 | 4/2017 | Allore et al. |
| 9,706,024 | B2* | 7/2017 | Shimoda ............ H04M 1/0266 |
| 2004/0188124 | A1 | 9/2004 | Stark |
| 2004/0222967 | A1* | 11/2004 | Riccomini ............ G06F 1/1626 |
| | | | 345/161 |
| 2006/0079128 | A1* | 4/2006 | Chintala ............ H04M 1/0252 |
| | | | 439/594 |
| 2007/0065091 | A1 | 3/2007 | Hinata et al. |
| 2011/0122334 | A1 | 5/2011 | Tang |
| 2011/0279961 | A1* | 11/2011 | Shedletsky ............ F16F 7/1028 |
| | | | 361/679.21 |
| 2013/0235539 | A1* | 9/2013 | Hashimoto ............ H05K 5/06 |
| | | | 361/752 |
| 2013/0300975 | A1 | 11/2013 | Suzuki |
| 2014/0111927 | A1 | 4/2014 | Raff |
| 2014/0240615 | A1* | 8/2014 | Allore ............... B29C 45/14311 |
| | | | 349/12 |
| 2014/0308469 | A1 | 10/2014 | Aida et al. |
| 2014/0376122 | A1 | 12/2014 | Lim et al. |
| 2015/0017779 | A1 | 1/2015 | Kim |
| 2015/0062787 | A1* | 3/2015 | Wilson .................. H04M 1/185 |
| | | | 361/679.01 |
| 2015/0177790 | A1 | 6/2015 | Uto et al. |
| 2016/0161641 | A1* | 6/2016 | Furusato ................ G02B 1/113 |
| | | | 368/296 |
| 2016/0227653 | A1* | 8/2016 | Kim ..................... G02B 5/3033 |
| 2016/0306229 | A1 | 10/2016 | Lee et al. |
| 2017/0196108 | A1 | 7/2017 | Inobe et al. |
| 2017/0212377 | A1* | 7/2017 | Hu ......................... G06F 3/041 |

FOREIGN PATENT DOCUMENTS

| | | |
|---|---|---|
| CN | 104536517 | 4/2015 |
| CN | 104536518 | 4/2015 |
| CN | 104866018 | 8/2015 |
| CN | 105116967 | 12/2015 |
| CN | 105187583 | 12/2015 |
| CN | 205005392 | 1/2016 |

OTHER PUBLICATIONS

WIPO, ISR for PCT/CN2016/081496, dated Aug. 16, 2016.

USPTO, Office Action for U.S. Appl. No. 15/713,663, dated Feb. 28, 2018.

USPTO, Office Action for U.S. Appl. No. 15/713,663, dated Sep. 18, 2018.

* cited by examiner

FRONT COVER ASSEMBLY AND TERMINAL

CROSS-REFERENCE TO RELATED APPLICATION

The application is a continuation of U.S. application Ser. No. 15/713,663, filed on Sep. 24, 2017, which is a continuation of International Application No. PCT/CN2016/081496, filed on May 10, 2016, which is based on and claims priority to Chinese Patent Application No. 201510552123.0, filed on Aug. 31, 2015. The entire disclosures of the aforementioned applications are incorporated herein by reference.

FIELD

The present disclosure relates to electronic communication technology, and more particularly, to a front cover assembly and a terminal.

BACKGROUND

With rapid development of technology, smart terminals are widely used. The smart terminals not only provide a mobile communication function for users, but also provide the users with various application programs. This brings the users great convenience. However, currently, these products do not have good waterproof and dustproof capabilities. The smart terminals may be damaged and cause data loss once the smart terminals fall into water, are splattered with a conducting liquid such as water, or are exposed to water vapor or a high-humidity environment.

Nowadays, most smart terminal products have a waterproof structure. If a waterproof and dustproof device is mounted on the smart terminal products, external appearance and aesthetics of the smart terminal products will be affected as well as overall thickness of the smart terminal products will increase. This is not good for user experience.

SUMMARY

As to the drawbacks in the existing skills, the objective of the present disclosure is to provide a front cover assembly and a terminal to carry out better waterproofing.

To achieve above objective, the present disclosure provides a front cover assembly including a frame, a cover glass, and a waterproof glue. The frame has a first wall and a second wall connecting to the first wall, and defines a receiving cavity. The cover glass is partially received in the receiving cavity of the frame. The cover glass has a lateral face facing the frame. The cover glass has a step portion at the lateral face. The step portion has a first face and a second face. A first gap is defined between the first face of the step portion and the first wall of the frame. A second gap is defined between the second face of the step portion and the second wall of the frame. The waterproof glue is located at the first face and the second face of the step portion of the cover glass, at the first wall and the second wall of the frame. The waterproof glue fills the first gap and the second gap, in which the first face and the second face of the step portion form an obtuse angle therebetween, and the obtuse angle faces the first wall and the second wall of the frame.

The present disclosure further provides a terminal including a rear cover, and a front cover assembly. The rear cover defines a receiving space. The front cover assembly is received in the receiving space. The front cover assembly includes a frame, a cover glass, a gap, and a waterproof glue. The frame defines a receiving cavity. The cover glass is received in the receiving cavity of the frame, and has a light exiting face and a lateral face extending from the light exiting face. The cover glass has a step portion located at the lateral face and extending toward the frame. The gap is defined between the step portion of the cover glass and the frame. The waterproof glue fills the gap and directly contacting the step portion and the frame, in which the frame has a first wall and a second wall connecting to the first wall, the step portion has a first face and a second face, and the first face and the second face of the step portion form an obtuse angle therebetween, and the obtuse angle faces the first wall and the second wall of the frame.

The present disclosure further provides a front cover assembly including a frame, a cover glass, a gap, and a waterproof glue. The frame defines a receiving cavity. The cover glass is received in the receiving cavity of the frame, and has a light exiting face and a lateral face extending from the light exiting face. The cover glass has a step portion located at the lateral face and extending toward the frame. The gap is defined between the step portion of the cover glass and the frame. The waterproof glue fills the gap and directly contacting the step portion and the frame, in which the lateral face of the cover glass has a first portion and a second portion, the step portion is deployed at the first portion, the second portion is connected to the light exiting face of the cover glass, and the second portion is a curved face and exposed to the environmental empty space located at the light exiting side.

Regarding the front cover assembly and the terminal provided in the present disclosure, the cover glass has the step portion located at the lateral face and extending toward the frame. A gap is defined between the step portion of the cover glass and the frame. The waterproof glue fills the gap and directly contacts the step portion and the frame. This prevents the water coming from outside, from permeating into the first gap and the second gap via the cover glass, causing the internal electric circuits of the terminal to contact with the water. In addition, this can further prevent the dust coming from outside, from falling or entering a space between the cover glass and a housing, thereby achieving waterproofing and dustproofing effectiveness.

DETAILED DESCRIPTION

Figure 1:
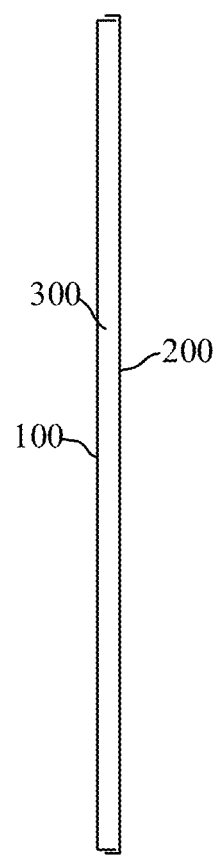
FIG. 1 is a lateral view of a terminal provided in accordance with an embodiment of the present disclosure.
Figure 2:
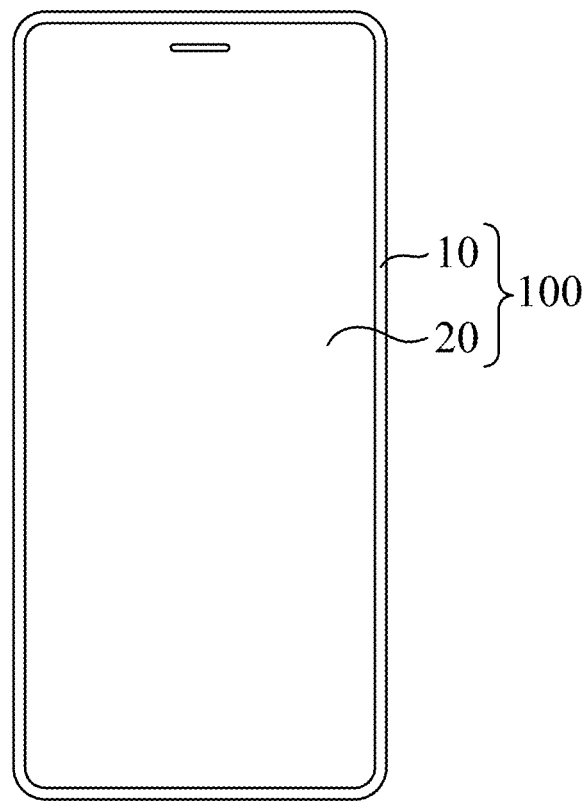
FIG. 2 is a top view of a terminal provided in accordance with an embodiment of the present disclosure.
Figure 3:
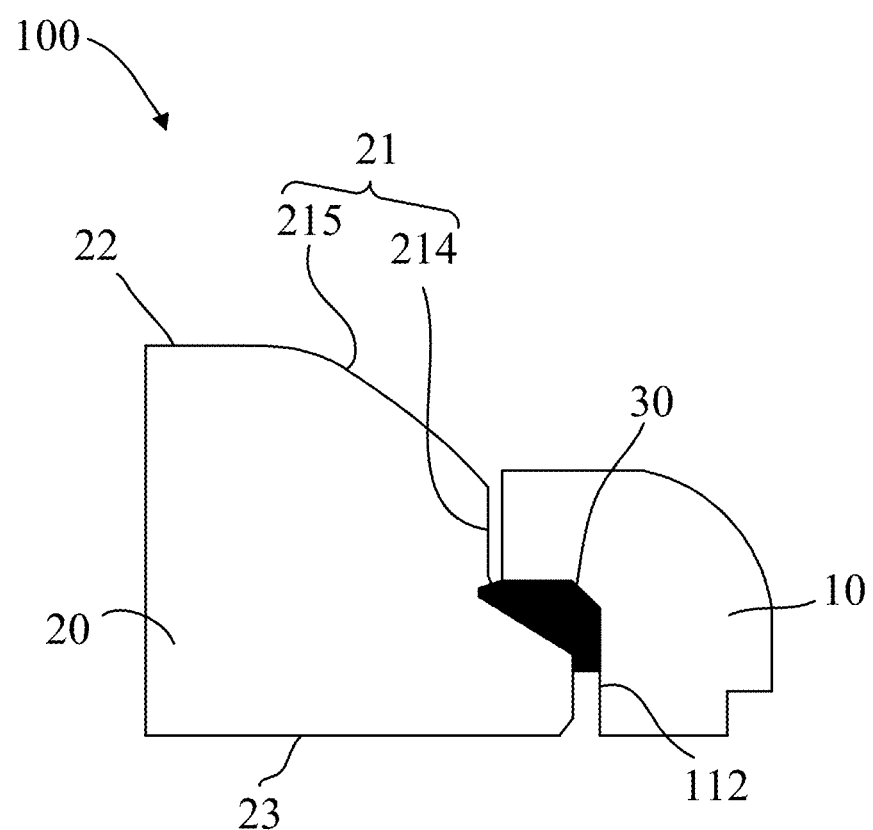
FIG. 3 is a schematic structural diagram showing a front cover assembly provided in accordance with an embodiment of the present disclosure.
Figure 4:
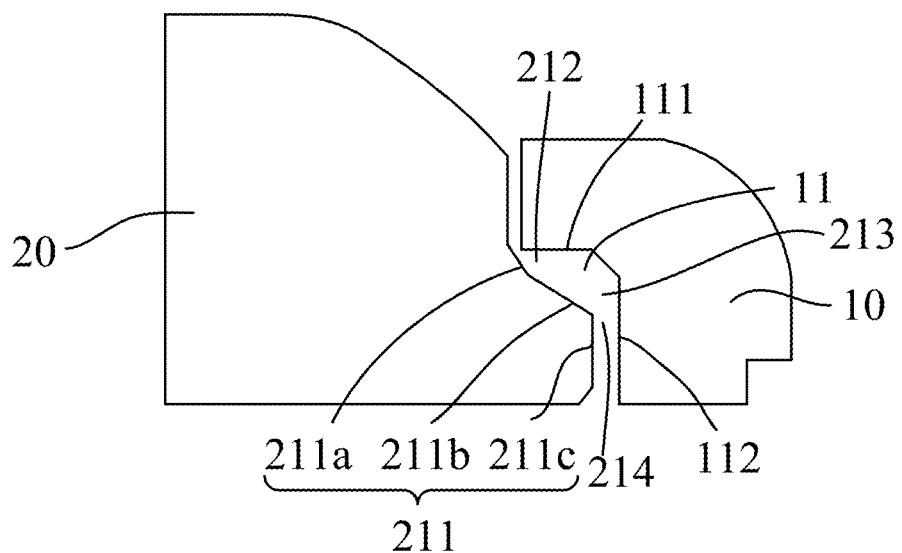
FIG. 4 is a schematic structural diagram showing a front cover assembly in the absence of a waterproof glue provided in accordance with an embodiment of the present disclosure.

The technical solutions in the embodiments of the present disclosure will be clearly and completely described below with reference to the accompanying drawings of the embodiments of the present disclosure.

Referring to FIGS. 1 to 4, the present disclosure provides a terminal. The terminal includes a front cover assembly 100 and a rear cover 200. The rear cover 200 has a receiving space 300. The front cover assembly 100 is fastened and received in the receiving space 300.

The terminal may be, but is not limited to, a mobile communication device such as a cell phone, a personal digital assistant (PDA), a tablet computer, and so on. In the present embodiment, the terminal is illustrated by a cell phone as an example.

The front cover assembly 100 includes a frame 10, a cover glass 20, and a waterproof glue 30. The frame 10 has a first wall 111 and a second wall 112 connecting to the first wall 111, and defines a receiving cavity 11. The first wall 111 and the second wall 112 surround the receiving cavity 11. The cover glass 20 is partially received in the receiving cavity 11 (and/or the frame 10). The cover glass 20 has an upper face 22 and a lateral face 21 extending along a circumferential periphery of the cover glass 20. In at least one embodiment, the lateral face 21 is surrounding the upper face 22. The upper face 22 is a light exiting face. The lateral face 21 of the cover glass 20 faces the frame 10. The cover glass 20 has a step portion 211 formed at the lateral face 21. The step portion 211 extends along the circumferential periphery of the cover glass 20. The step portion 211 has a first face 211a and a second face 211b extending from the first face 211a. The first face 211a is adjacent to the second face 211b. A first gap 212 is defined between the first face 211a of the step portion 211 and the first wall 111 of the frame 10. A second gap 213 is defined between the second face 211b of the step portion 211 and the second wall 112 of the frame 10. The waterproof glue 30 is applied on the step portion 211 of the cover glass 20, on the first wall 111 and the second wall 112 of the frame 10. The waterproof glue 30 fills the first gap 212 and the second gap 213.

Regarding the front cover assembly 100 provided in the present disclosure, the step portion 211 is deployed at the peripheral area of the cover glass 20. The cover glass 20 is partially received in the receiving cavity 11 of the frame 10. A gap (including the first gap 212 and the second gap 213) exists between the lateral face 21 of the cover glass 20 and the frame 10. The waterproof glue 30 is applied on the step portion 211 and covers the step portion 211. In such a way, the waterproof glue 30 can fill the gap defined between the step portion 211 of the cover glass 20 and the frame 10. This prevents water coming from outside of the cover glass 20 or the frame 10, from permeating into the receiving cavity 11 via the cover glass 20, or prevents the dust coming from outside of the cover glass 20, from falling into the receiving cavity 11, thereby achieving waterproofing and dustproofing effectiveness. In addition, the step portion 211 deployed at the lateral face 21 of the cover glass 20 is configured to dispose the waterproof glue 30. This reduces the space of the receiving cavity 11 and the cover glass 20 occupied by the waterproof glue 30, and at the same time waterproofing is assured. In this way, overall thickness of the waterproof device 100 is reduced.

In the present embodiment, the frame 10 is shaped as a rectangle. Material of the frame 10 is a rigid rubber. In such a way, excellent bonding is carried out between the frame 10 and the waterproof glue 30. The separation between the frame 10 and the waterproof glue 30 is avoided. Thus, better waterproofing is achieved. The frame 10 has a first degree of softness, that is, the rigid rubber has the first degree of softness. The four corners of the frame 10 are round corner portions. In this way, it is convenient to grip for a user with greater comfort, thereby improving user experience. The thickness of the frame 10 (i.e., the thickness taken along a direction perpendicular to a plane that the frame 10 is located on) is less than that of the cover glass 20. In this way, the cover glass 20 is partially received in the frame 10 as well as the overall thickness of the front cover assembly 100 is reduced. It can be understood that the frame 10 can be disposed and adjusted according to a shape of the terminal in other embodiments.

Further, the waterproof glue 30 is coated around the frame 10, thereby preventing water coming from outside of the frame 10, from permeating into an inner side of the frame 10 and thus carrying out waterproofing.

The receiving cavity 11 is defined by the first wall 111 and the second wall 112 connecting with the first wall 111. In the present embodiment, the cross-section of the receiving cavity 11 is shaped as sawtooth. The first wall 111 is a top wall of the frame 10. The second wall 112 is a lateral wall of the frame 10 that surrounds the first wall 111. Also, in order to better receive the cover glass 20, a round corner portion is disposed between the first wall 111 and the second wall 112. That is, a portion connected between the first wall 111 and the second wall 112 is a round corner portion.

The cover glass 20 is fastened inside the receiving cavity 11. In the present embodiment, the cover glass 20 is a rectangular plate structure. In order to assure cooperation between the cover glass 20 and the receiving cavity 11, the corners of the cover glass 20 are round corner portions. For ease of light transmission, the cover glass 20 is a piece of transparent glass. The cover glass 20 is a rectangular plate member. The cover glass 20 can increase light transmittance of a display screen and enhance visual effects of the terminal. In addition, the cover glass 20 is a transparent rigid plate member, thereby having excellent protective effects on internal components of the terminal and carrying out excellent light transmittance.

Further, the thickness of the cover glass 20 ranges from 0.3 mm to 2.0 mm, for example, 0.3 mm, 0.4 mm, 0.5 mm, 0.6 mm, 0.7 mm, 0.8 mm, 0.9 mm, 1 mm, 1.1 mm, 1.2 mm, 1.3 mm, 1.4 mm, 1.5 mm, 1.6 mm, 1.7 mm, 1.8 mm, 1.9 mm, and 2 mm. In such a way, the cover glass 20 can make the terminal become thinner and meet the requirements of thickness of the terminal in a further step, as well as assuring sufficient strength of the terminal.

The cover glass 20 includes the upper face 22 and a lower face 23 opposite to each other. In the present embodiment, the upper face 22 is a light exiting face and the lower face 23 is a light entering face. The upper face 22 is utilized to emit light rays. In an embodiment, a light-blocking region (not labeled in the drawings) is disposed on the lower face 23. The light-blocking region is configured to cover the electronic wires connected between the cover glass 20 and other components, thereby assuring not to affect the external appearance and aesthetics of the front cover assembly 100.

Figure 5:
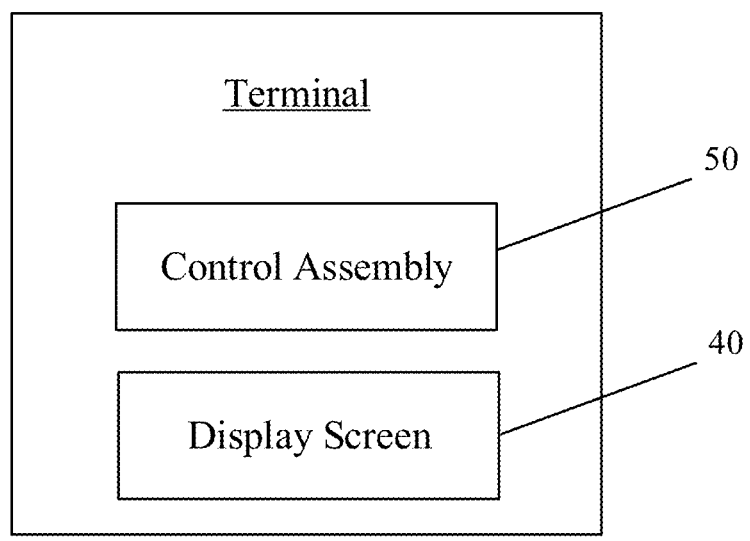
FIG. 5 is a block diagram showing a terminal provided in accordance with an embodiment of the present disclosure.

Referring to FIG. 5, the front cover assembly 100 further includes a display screen 40. The display screen 40 includes a display surface (not shown) attached to the lower face 23 of the cover glass 20 to show displayed images on the upper face 22 of the cover glass 20. In the present embodiment, the display surface of the display screen 40 is adhered to the lower face 23 of the cover glass 20 via adhesive, thereby assuring a tight connection between the display screen 40 and the cover glass 20. It can be understood that the display screen 40 can also be connected to the cover glass 20 by a PET (polyethylene terephthalate) adhesive strips.

The lateral face 21 of the cover glass 20 includes a first portion 214 and a second portion 215. The step portion 211 is deployed at the first portion 214. The second portion 215 is connected to the upper face 22. In the present embodiment, the second portion 215 is smoothly disposed between the first portion 214 and the upper face 22. The second portion 215 is a curved face. In such a way, it can refract the light from the light-blocking region on the lower face 23. The user can perceive a narrow-bezel visual effect in using the front cover assembly 100. The user experience is further improved.

In the present embodiment, the step portion 211 can be formed by CNC (computer numerical control) machining. In this way, the formed step portion 211 can get better precision. In an embodiment, the first 211a and the second face 211b of the step portion 211 form a first obtuse angle therebetween. The first obtuse angle faces the frame 10. In the illustrated embodiment, the first obtuse angle faces the first wall 111 and the second wall 112 of the frame 10. In at least one embodiment, the step portion 211 further includes a third face 211c extending from the second face 211b. The third face 211c and the second face 211b define a second obtuse angle therebetween. The second obtuse angle faces the cover glass 20 and departs away from the frame 10. The step portion 211 can be an L-shaped step portion, which can accommodate the waterproof glue 30. It can be understood that the step portion 211 can be formed with other shapes such as a stair-step shape in other embodiments.

In the present embodiment, the first gap 212 is defined between the first face 211a of the step portion 211 and the first wall 111 of the frame 10 and the second gap 213 is defined between the second face 211b of the step portion 211 and the second wall 112 of the frame 10. In order to fill the first gap 212 and the second gap 213 to prevent water or dust from entering the first gap 212 and the second gap 213, the waterproof glue 30 is applied to the first face 211a and the second face 211b of the step portion 211 and is abutted between the first wall 111 and the second wall 112 of the frame 10.

Further, the waterproof glue 30 and the first face 211a and the second face 211b of the step portion 211 engage each other by interference fit, thereby further preventing the water or dust from entering via the step portion 211. In an embodiment, a length of interference of the waterproof glue 30 extending from the second gap 213 to a third gap 214 may range from 0.03 mm to 0.1 mm, for example, 0.03 mm, 0.035 mm, 0.04 mm, 0.045 mm, 0.05 mm, 0.055 mm, 0.06 mm, 0.065 mm, 0.07 mm, 0.075 mm, 0.08 mm, 0.085 mm, 0.09 mm, 0.095 mm, and 0.1 mm. The third gap 214 is defined between the third face 211c of the step portion 211 and the second wall 112 of the frame 10. In this way, the adhesive force between the waterproof glue 30 and the step portion 211 is strengthened, thereby assuring that the waterproof glue 30 and the step portion 211 are not easy to be separated from each other.

The waterproof glue 30 is a soft glue. The waterproof glue 30 is sprayed on the first face 211a and the second face 211b of the step portion 211 by a spray machine (not shown), and forms a sealed, glued path along an extended direction of the step portion 211. In at least one embodiment, the waterproof glue 30 surrounds the cover glass 20. In this way, this prevents the liquid or dust coming from outside of the cover glass 20, from entering the first gap 212 and the second gap 213 via the cover glass 20. Meanwhile, since the waterproof glue 30 forms the sealed, glued path along the extended direction of the step portion 211, this can prevent the glue from breaking off or hanging over, thereby further assuring waterproofing. The waterproof glue 30 has a second degree of softness, that is, the soft glue has the second degree of softness. The second degree of softness is less than the first degree of softness of the frame 10. In the present embodiment, in order to assure waterproofing, the waterproof glue 30 adopts the soft glue, thereby carrying out adhesion in a quick manner, assuring tightness of the adhesion, and further assuring waterproofing. In addition, since the waterproof glue 30 is a soft glue and the frame 10 adopts a rigid rubber, the combination of the soft glue and the rigid rubber makes the waterproof glue 30 and the frame 10 tightly adhered to each other, thereby further assuring waterproofing. When spraying using the spray machine, the waterproof glue 30 forms the glued path along the extended direction of the step portion 211. The waterproof glue 30 fills the receiving cavity 11. In this way, the cover glass 20 and the frame 10 are attached together, and meanwhile the waterproof glue 30 can fill the gaps between the cover glass 20 and the frame 10 to prevent water or dust from entering via the gaps, causing a short in the internal circuits or falling dust that leads to an inconvenience to clean way.

Further, since the cover glass 20 forms the glued path along the bottom face 211a of the step portion 211, this acts as a buffer of the cover glass 20 and prevents the cover glass 20 from being damaged by an external impact or squeeze.

Further, the height of the waterproof glue 30 ranges from 0.2 mm to 0.3 mm, for example, 0.2 mm, 0.21 mm, 0.22 mm, 0.23 mm, 0.24 mm, 0.25 mm, 0.26 mm, 0.27 mm, 0.28 mm, 0.29 mm, and 0.3 mm. That is, the height of the glued path ranges from 0.2 mm to 0.3 mm. In such a way, it is assured that the waterproof glue 30 and the cover glass 20 engage each other by interference fit, the requirement of the interference is met, and the buffer function is carried out. It can be understood that the height of the waterproof glue 30 can be adjusted based on the actual situation (e.g., ranging from 0.3 mm to 0.4 mm) in other embodiments.

The waterproof glue 30 is sprayed on the first face 211a and the second face 211b of the step portion 211 by the spray machine. Meanwhile, the speed and frequency in spraying the waterproof glue 30 using the spray machine can be adjusted so as to control the height of the glued path formed by the waterproof glue 30 on the first face 211a and the second face 211b of the step portion 211. The cover glass 20 and the waterproof glue 30 are prepressed using a pressure pre-charging or maintaining device to assure that a predetermined amount of interference exists between the cover glass 20 and the waterproof glue 30, thereby carrying out better waterproofing between the cover glass 20 and the frame 10. The waterproof glue 30 occupies a small space. The material of the waterproof glue 30 is a soft glue and the frame 10 is a rigid rubber. In this way, a better adhesion effect is assured as well as this can prevent the waterproof glue 30 from breaking off or hanging over. It is beneficial to assure the waterproof and dustproof sealing properties of the cover glass 20 and the frame 10. In addition, the waterproof glue 30 is the soft glue, which does not occupy extra space of the cover glass 20 and the frame 10. It is beneficial to improve structure compactness of the front cover assembly 100.

Further, referring to FIG. 5, the terminal further includes a control assembly 50. The control assembly 50 is coupled to the front cover assembly 100. The control assembly 50 is configured to control the front cover assembly 100 to carry out a display function. In an embodiment, the control assembly 50 controls the display screen 40 to display images. The display screen 40 is disposed below the cover glass 20 and overlaps with it so as to transmit the images via the cover glass 20.

Regarding the front cover assembly 100 provided in the present disclosure, the step portion 211 is deployed at the lateral face 21 of the cover glass 20 and extending along a circumferential periphery of the cover glass 20. The step portion 211 has the first face 211a and the second face 211b, and the third part 211c. A first gap 212 is defined between the first face 211a of the step portion 211 and the first wall 111 of the frame 10. A second gap 213 is defined between the second face 211b of the step portion 211 and the second wall 112 of the frame 10. The waterproof glue 30 is disposed on the first face 211a and the second face 211b of the step portion 211, and on the first wall 111 and the second wall 112 of the frame 10. In such a way, the waterproof glue 30 can fill the first gap 212 and the second gap 213. This prevents the water coming from outside, from permeating into the first gap 212 and the second gap 213 via the cover glass 20, causing the internal electric circuits of the terminal to contact with the water. In addition, this can further prevent the dust coming from outside, from falling or entering a space between the cover glass 20 and a housing, thereby achieving waterproofing and dustproofing effectiveness.

Above descriptions are preferred embodiments of the present invention. It should be noted that various modifications and alterations can be made by persons skilled in this art without departing from the principles of the present invention, and that all modifications and alterations are within the scope of the present invention.

What is claimed is:

1. A front cover assembly, comprising:
 a frame, having a first wall and a second wall connecting to the first wall, and defining a receiving cavity;
 a cover glass partially received in the receiving cavity of the frame, the cover glass having a lateral face facing the frame, the cover glass having a step portion at the lateral face, the step portion having a first flat face and a second flat face, a first gap being defined between the first flat face of the step portion and the first wall of the frame, a second gap being defined between the second flat face of the step portion and the second wall of the frame; and
 a waterproof glue, located at the first flat face and the second flat face of the step portion of the cover glass, at the first wall and the second wall of the frame, wherein the waterproof glue fills the first gap and the second gap,
 wherein the first flat face and the second flat face of the step portion form a first obtuse angle therebetween, and the first obtuse angle faces the first wall and the second wall of the frame;
 wherein the waterproof glue and the step portion engage each other by interference fit;
 wherein the step portion further comprises a third face extending from the second flat face, the third face and the second wall define a third gap therebetween, a length of interference of the waterproof glue extending from the second gap to the third gap ranges from 0.03 mm to 0.10 mm.

2. The front cover assembly according to claim 1, wherein the first wall is a top wall of the frame, the second wall is a lateral wall of the frame, and a round corner portion connects the first wall and the second wall.

3. The front cover assembly according to claim 1, wherein the waterproof glue forms a glued path along an extended direction of the step portion.

4. The front cover assembly according to claim 1, wherein the frame has a first degree of softness, the waterproof glue has a second degree of softness, and the second degree of softness is less than the first degree of softness.

5. The front cover assembly according to claim 1, wherein material of the frame is a rigid rubber.

6. The front cover assembly according to claim 1, wherein a thickness of the frame is less than a thickness of the cover glass.

7. The front cover assembly according to claim 1, wherein a cross-section of the receiving cavity is shaped as sawtooth.

8. The front cover assembly according to claim 1, wherein the cover glass is a transparent rigid plate member.

9. The front cover assembly according to claim 1, wherein a thickness of the cover glass ranges from 0.3 mm to 2.0 mm.

10. The front cover assembly according to claim 1, wherein a height of the waterproof glue ranges from 0.2 mm to 0.3 mm.

11. The front cover assembly according to claim 1, further comprising a display screen, the display screen being disposed below the cover glass and overlapping with the cover glass so as to transmit images via the cover glass.

12. The front cover assembly according to claim 1, wherein the third face and the second flat face define a second obtuse angle therebetween, and the second obtuse angle faces the cover glass and departs away from the frame.

13. A terminal, comprising: a rear cover, and a front cover assembly, the rear cover defining a receiving space, the front cover assembly being received in the receiving space, the front cover assembly comprising:
 a frame defining a receiving cavity;
 a cover glass received in the receiving cavity of the frame, the cover glass having a light exiting face and a lateral face extending from the light exiting face, the cover glass having a step portion located at the lateral face and extending toward the frame;
 a gap defined between the step portion of the cover glass and the frame; and
 a waterproof glue filling the gap and directly contacting the step portion and the frame,
 wherein the frame has a first wall and a second wall connecting to the first wall, the step portion has a first flat face and a second flat face, a first gap is defined between the first flat face of the step portion and the first wall of the frame, a second gap is defined between the second flat face of the step portion and the second wall of the frame, and the first flat face and the second flat face of the step portion form an obtuse angle therebetween, and the obtuse angle faces the first wall and the second wall of the frame;
 wherein the waterproof glue and the step portion engage each other by interference fit, and wherein the step portion further comprises a third face extending from the second flat face, the third face and the second wall define a third gap therebetween, a length of interference of the waterproof glue extending from the second gap to the third gap ranges from 0.03 mm to 0.10 mm.

14. The terminal according to claim 13, further comprising a control assembly, the control assembly being coupled to the front cover assembly and configured to control the front cover assembly to carry out a display function.

15. A front cover assembly, comprising:
 a frame defining a receiving cavity;
 a cover glass received in the receiving cavity of the frame, the cover glass having a light exiting face and a lateral face extending from the light exiting face, the cover glass having a step portion located at the lateral face and extending toward the frame;
 a gap defined between the step portion of the cover glass and the frame; and
 a waterproof glue filling the gap and directly contacting the step portion and the frame, wherein the lateral face of the cover glass has a first portion and a second portion, the step portion is deployed at the first portion, the second portion is connected to the light exiting face of the cover glass, and the second portion is a curved face and exposed to the environmental empty space located at the light exiting side;

wherein the frame has a first wall and a second wall connecting to the first wall, the step portion has a first flat face and a second flat face, a first gap is defined between the first flat face of the step portion and the first wall of the frame, a second gap is defined between the second flat face of the step portion and the second wall of the frame, and the first flat face and the second flat face of the step portion form an obtuse angle therebetween, and the obtuse angle faces the first wall and the second wall of the frame;

wherein the waterproof glue and the step portion engage each other by interference fit, and wherein the step portion further comprises a third face extending from the second flat face, the third face and the second wall define a third gap therebetween, and the waterproof glue extends from the second gap to the third gap by a predetermined length.

16. The front cover assembly according to claim 15, wherein the step portion extends along a circumferential periphery of the cover glass.

17. The front cover assembly according to claim 15, wherein the waterproof glue is applied on the first flat face and the second flat face of the step portion and is abut on the first wall and the second wall of the frame.

* * * * *